United States Patent
Tujkovic et al.

(10) Patent No.: US 8,675,761 B2
(45) Date of Patent: Mar. 18, 2014

(54) ALLOCATING ANTENNAS FOR CYCLIC DELAY DIVERSITY TRANSMISSION

(75) Inventors: Djordje Tujkovic, Santa Clara, CA (US); Vummintala Shashidhar, Bangalore (IN); Erik Stauffer, Santa Clara, CA (US); Rishi Ranjan, Santa Clara, CA (US); Soumen Chakraborty, Santa Clara, CA (US); Bertrand Hochwald, Santa Clara, CA (US); Sriram Rajagopal, Bangalore (IN); Sam Alex, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 822 days.

(21) Appl. No.: 12/815,540

(22) Filed: Jun. 15, 2010

(65) Prior Publication Data

US 2011/0223870 A1   Sep. 15, 2011

Related U.S. Application Data

(60) Provisional application No. 61/314,009, filed on Mar. 15, 2010.

(51) Int. Cl.
*H04L 1/02* (2006.01)

(52) U.S. Cl.
USPC ........................................................ 375/267

(58) Field of Classification Search
USPC ......... 375/267, 130, 146, 284, 299, 347, 349; 370/203, 310, 342; 455/423, 561
See application file for complete search history.

(56) References Cited

U.S. PATENT DOCUMENTS

| | | | |
|---|---|---|---|
| 8,218,669 | B2 * | 7/2012 | Erlich ........................... 375/267 |
| 2008/0122542 | A1 | 5/2008 | Bowles et al. |
| 2009/0103644 | A1 | 4/2009 | Nakao |
| 2010/0002800 | A1 | 1/2010 | Kim et al. |
| 2010/0062813 | A1 | 3/2010 | Kujanski et al. |
| 2011/0176635 | A1 * | 7/2011 | Hochwald et al. ............ 375/299 |
| 2011/0206030 | A1 * | 8/2011 | Hoshino et al. ............... 370/342 |

OTHER PUBLICATIONS

International Search Report for PCT/US2011/028342, mailed May 5, 2011, 2 pages.

* cited by examiner

*Primary Examiner* — Khai Tran
(74) *Attorney, Agent, or Firm* — Sterne, Kessler, Goldstein & Fox P.L.L.C.

(57) ABSTRACT

Methods and apparatus of allocating antennas for cyclic delay diversity (CDD) transmission are disclosed. One method includes estimating a transmission channel of a transceiver having a plurality of antennas. A subset of a plurality of transceiver antennas is selected based on the estimated transmission channel. A single transceiver antenna of the subset is identified based on a channel quality of a transmission path of the single transceiver antenna. Cyclic delay diversity (CDD) signals are transmitted from the subset of the plurality of antennas, wherein a minimally delayed CDD signal is transmitted from the identified single transceiver antenna of the subset of the plurality of transceiver antennas.

27 Claims, 5 Drawing Sheets

ALLOCATING ANTENNAS FOR CYCLIC DELAY DIVERSITY TRANSMISSION

RELATED APPLICATIONS

This patent application claims priority to U.S. provisional patent application Ser. No. 61/314,009 filed on Mar. 15, 2010 which is incorporated by reference.

FIELD OF THE DESCRIBED EMBODIMENTS

The described embodiments relate generally to wireless communication. More particularly, the described embodiments relate to methods and systems for allocating antennas for cyclic delay diversity transmission.

BACKGROUND

Wireless communication systems are widely deployed to provide various types of communication content such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Worldwide Interoperability for Microwave Access (WiMAX), and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

It is desirable to improve the quality of uplink transmission of a wireless multiple-access communication system.

SUMMARY

An embodiment includes a method of allocating antennas for cyclic delay diversity (CDD) transmission. The method includes estimating a transmission channel of a transceiver having a plurality of antennas. A subset of the plurality of transceiver antennas is selected based on the estimated transmission channel. A single transceiver antenna of the subset is identified based on a channel quality of a transmission path of the single transceiver antenna. Cyclic delay diversity (CDD) signals are transmitted from the subset of the plurality of antennas, wherein a minimally delayed CDD processed signal is transmitted from the identified single transceiver antenna of the subset of the plurality of transceiver antennas.

Another embodiment includes a method of allocating antennas for cyclic delay diversity (CDD) transmission. The method includes estimating channel qualities of a transceiver having a plurality of antennas. A single transceiver antenna of the subset is identified based on the channel quality of the single transceiver antenna. Cyclic delay diversity (CDD) signals are transmitted from the plurality of antennas, wherein a minimally delayed CDD processed signal is transmitted from the identified single transceiver antenna of the subset of the plurality of transceiver antennas.

Another embodiment includes a mobile subscriber. The mobile subscriber includes a plurality of antennas, and a controller operative to identifying a single antenna of the plurality of antennas based on a channel quality of the single antenna. The mobile subscriber transmits cyclic delay diversity (CDD) signals from the plurality of antennas, wherein a minimally delayed CDD processed signal is transmitted from the identified single antenna of the subset of the plurality of transceiver antennas.

Other aspects and advantages of the described embodiments will become apparent from the following detailed description, taken in conjunction with the accompanying drawings, illustrating by way of example the principles of the described embodiments.

DETAILED DESCRIPTION

Embodiments of systems, methods and apparatuses for improving the quality of uplink transmission of a subscriber station are disclosed. Generally, qualities of transmission channels associated with antennas of the subscriber station are used to allocate cyclic delay diversity signals to the antennas. Additionally, transmission powers associated with each of the antennas can be determined based on the qualities of the transmission channels. The descriptions of the embodiment use the terms subscriber station and mobile subscriber interchangeably.

Cyclic Delay Diversity (CDD) is a diversity scheme used in OFDM (orthogonal frequency division modulation) based telecommunication systems, transforming spatial diversity into frequency diversity avoiding inter symbol interference. In telecommunications, a diversity scheme refers to a method for improving the reliability of a message signal by using two or more communication channels with different characteristics. Diversity plays an important role in combating fading and co-channel interference and avoiding error bursts. It is based on the fact that individual channels experience different levels of fading and interference. Multiple versions of the same signal may be transmitted and/or received and combined in the receiver.

The embodiments described generally include an uplink utilizing CDD. However, it is to be understood that other equivalent embodiments exist. For example, CDD can be implemented in either the time domain by cyclically shifting the signal before application of the cyclic prefix, or in the frequency domain by rotating the complex signal on a sub-carrier by sub-carrier basis before application of the IFFT (inverse fast Fourier transform) with a phase that changes linearly proportional the sub-carrier index. Additionally, the frequency implementation is selectively applied to a subset of the sub-carriers, which is equivalent to applying a fractional delay to time-domain samples of a subset of carriers.

Additionally, rather than pure CDD, an embodiment includes cyclic amplitude diversity. This can include a combination of CDD and amplitude variability, and allows the amplitude on each antenna to change as a function of time and/or tone. An alternate form introduces a phase rotation on each transmit antenna.

Figure 1:
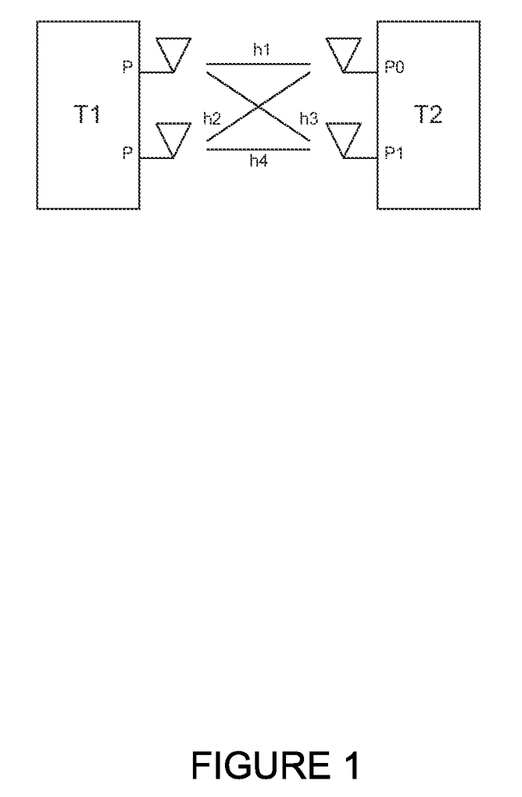
FIG. 1 shows a multiple antenna base station and a multiple antenna subscriber station.

FIG. 1 shows a multiple antenna base station and a multiple antenna subscriber station. CDD is a transmission technique that utilizes more than one transmitter in an OFDM system by transmitting cyclically shifted copies of a signal. The cyclic shift is performed in the time domain, before the application of the cyclic prefix. Each transmitter is assumed to use the same transmit power. Given an OFDM system with $N_{FFT}$ points in the FFT (tones), a time domain cyclic shift is equivalent to a phase shift of $$e^{j\frac{2\pi k \delta}{N_{FFT}}}$$

on the k th tone for a cyclic shift of $\delta$ OFDM samples. Therefore, CDD is equivalent to forming a frequency dependent beam. At the receiver, these duplicate signal copies appear simply as multipath. The multipath causes constructive and destructive interference at different frequencies.

It is to be understood that the described embodiments are applicable to systems like that of FIG. 1. FIG. 1 includes a first transceiver T1 and a second transceiver T2 having multiple antennas. However, it is to be understood that the first transceiver T1 can include one or more antennas, and does not have to include CDD transmission. However, for an embodiment the first transceiver T1 and the second transceiver T2 comprise a system using CDD (where $\delta$ is an integer) that has an integer number of phase rolls in the cyclically delayed signal over the signal bandwidth. For the following description, T1 is a base station (BS) and T2 is a mobile station (MS). The received signal strength at the MS antenna 0 and 1 can be given as $$RSSI_{MS,0}=(|h_1|^2+|h_2|^2)P$$

$$RSSI_{MS,1}=(|h_3|^2+|h_4|^2)P,$$

where P is an exemplary transmit power of the BS.
The received signal at the BS antenna 0 and 1 can be given as $$RSSI_{BS,0}=|h_1|^2 P_0+|h_3|^2 P_1$$

$$RSSI_{BS,1}=|h_2|^2 P_0+|h_4|^2 P_1,$$

where $P_0$ and $P_1$ are exemplary transmit powers at the BS antenna 0 and 1, respectively.
The total received power at the BS is given as $$RSSI_{BS}=RSSI_{BS,0}+RSSI_{BS,1}=(|h_1|^2+|h_2|^2)P_0+(|h_3|^2+|h_4|^2)P_1.$$

The maximum transmit power of MS is given as $P_{MS,max}$, and the maximum transmit power of antenna 0 and 1 is $P_{0,max}$ and $P_{1,max}$, respectively. To simplify the subsequent discussion, it is assumed that $P_{0,max}=P_{1,max}=P_{total}$ and $P_{MS,max} \leq 2P_{total}$.

The described embodiments additionally include smart CDD transmission. Smart CDD is an adaptation of CDD that utilizes channel state information. Instead of transmitting the signal, or a cyclically shifted version, from each antenna using equal power, the knowledge of the channel can be used to determine how much power to use on each transmit antenna. For the following descriptions, the first transceiver is represented by a base station (BS), and the second transceiver is represented by a mobile station (MS). Smart CDD is based on minimizing the total transmit power of, for example, the mobile station (MS) in order to achieve either a target transmit power of the MS, $P_{MS}$, or a total received power at, for example, the base station (BS), $RSSI_{BS}$. Using the observation that the total received signal power at the BS is given as $$RSSI_{BS}=RSSI_{BS,0}+RSSI_{BS,1}=(|h_1|^2+|h_2|^2)P_0+(|h_3|^2+|h_4|^2)P_1,$$

and that the MS has a measurement of $|h_1|^2+|h_2|^2$ and $|h_3|^2+|h_4|^2$ via the measurement of $RSSI_{MS,0}$ and $RSSI_{MS,0}$, the minimum transmit power is achieved by selecting the MS transmit antenna with highest power gain to the BS. The antenna having the highest power gain can be referred to as the primary antenna:

$$\text{primary} = \begin{cases} 0: & |h_1|^2+|h_2|^2 > |h_3|^2+|h_4|^2 \\ 1: & |h_1|^2+|h_2|^2 < |h_3|^2+|h_4|^2 \end{cases}$$

Since the primary antenna has the highest power gain from the MS to the BS, it can be desirable to transmit from the primary antenna only. Single antenna transmit diversity would similarly place all transmit power on the selected primary antenna. If the primary antenna is not capable of delivering the desired amount of power, then the other secondary antenna should be utilized. The utilization of the second antenna differentiates Smart CDD from transmit diversity.

The receiver of the BS can be simplified by always using a cyclic delay of k=0 on the primary antenna. A nonzero cyclic delay should be placed on the secondary antenna.

Smart CDD has the advantage over CDD in that the depth of the nulls in the transmit spectrum are minimized. When only one transmit antenna is in use, the transmit spectrum of the device is flat. Even after the second cyclically delayed signal is transmitted, it is transmitted with the minimum power needed to achieve the transmit power target. A flat spectrum is preferred over a non-flat spectrum of the same mean received power when the power is spread across the signal bandwidth, such as WiMAX PUSC.

Target Transmit Power

If the goal of the MS is to transmit with total transmit power $P_{MS}$, the power is split between the primary ($P_{primary}$) and secondary ($P_{secondary}$) antennas in the following way. If $P_{MS} \leq P_{total}$ (where $P_{MS}$ is the desired transmit power at the MS, and $P_{total}$ is, for example, the maximum power of a power amplifier of each of the antennas), then $P_{primary}=P_{MS}$, $P_{secondary}=0$.

If $P_{MS,max} \geq P_{MS} > P_{total}$ then $P_{primary}=P_{MS}$ and $P_{secondary}=P_{MS}-P_{primary}$.

If $P_{MS} \geq P_{MS,max}$, then $P_{primary}=P_{total}$, and $P_{secondary}=P_{MS,max}-P_{primary}$ (where $P_{MS,max}$ is the maximum transmit power of the mobile station).

It is to be understood that embodiments include the power distribution as shown being distributed amongst any number of antennas greater than two.

Target Received Power at the BS

If the goal of the MS is to transmit with a total received power at the BS $RSSI_{BS}$, the power is split between the primary and secondary antennas in the following way, where the channel gain derived from the RSSI is referred to as $$G_0 = \frac{RSSI_0}{P} = |h_1|^2 + |h_2|^2 \text{ and } G_1 = \frac{RSSI_1}{P} = |h_3|^2 + |h_4|^2.$$

$$P_{MS} = RSSI_{BS} / G_{primary}$$

If $P_{MS} \le P_{total}$, then $P_{primary} = P_{MS}$, $P_{secondary} = 0$.

If $P_{MS} > P_{total}$, then $P_{primary} = P_{total}$, and $$P_{secondary} = \min\left(\frac{P_{MS} - P_{primary}}{G_{secondary}} G_{primary}, P_{MS,max} - P_{primary}\right).$$

Again, if the mobile station (MS) includes more than two antennas, the described distribution of transmit power is continued across the antennas. It is to be understood that the antenna of the MS that is designated as the primary antenna can change over time as the link quality associated with each antenna changes.

Figure 2:
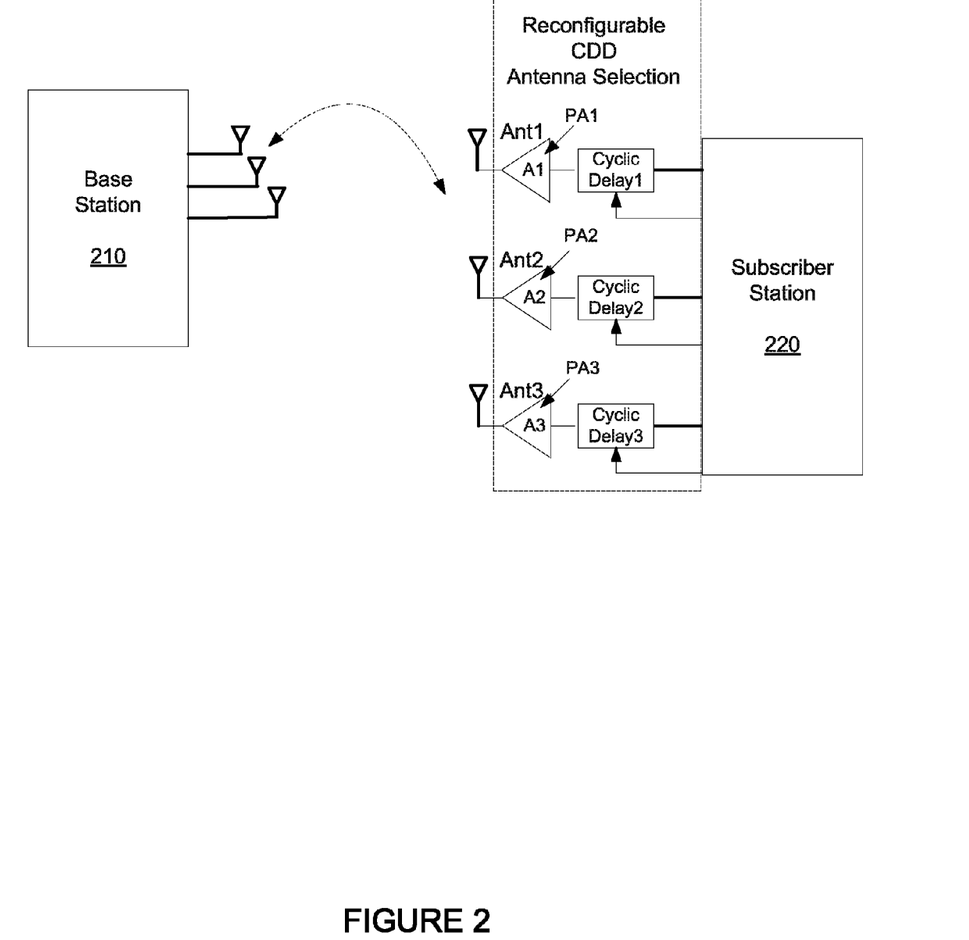
FIG. 2 shows an example of a wireless system that includes a multiple antenna base station transmitting downlink signals to a multiple antenna subscriber station, wherein the subscriber station strategically allocates uplink cyclic delay diversity transmission amongst its multiple antennas.

FIG. 2 shows an example of a wireless system that includes a multiple antenna base station transmitting downlink signals to a multiple antenna subscriber station, wherein the subscriber station strategically allocates uplink cyclic delay diversity transmission amongst its antennas. As shown, a wireless link is established between a base station 210 and a subscriber station 220.

The subscriber station 220 includes multiple antennas. Transmission (uplink) from the subscriber station 220 utilizes CDD transmission. More specifically, the delays of the CDD transmission can be allocated amongst the multiple antennas of the subscriber station according to a link quality corresponding with each of the multiple antennas. The subscriber station antenna that has the best link quality (or the antenna with one of the best) can be assigned the least delay, and the delay of each antenna can increase approximately proportional to the inverse of the link quality. That is, the better the link quality for each antenna, generally, the smaller the delay associated with the antenna. The worse the link quality for each antenna, generally, the larger the delay associated with the antenna.

Additionally, the power level of signals transmitted from each of the antennas can be based on a target transmission power. First, transmission power is allocated to the antenna having the best quality (or at least one of the best) channel. If the target transmission power exceeds, for example, the rated power level of a power amplifier of the antenna having the best quality channel, then transmission power is additionally allocated to the other antennas. The power can be allocated amongst any number of the antennas, wherein the number is dependent upon the target transmission power level, and for example, the power rating of the power amplifiers (PA1, PA2, PA3) associated with each of the antennas (Ant. 1, Ant. 2, Ant. 3). As shown, the power amplifiers (PA1, PA2, PA3) have adjustable gain factors A1, A2, A3.

Figure 3:
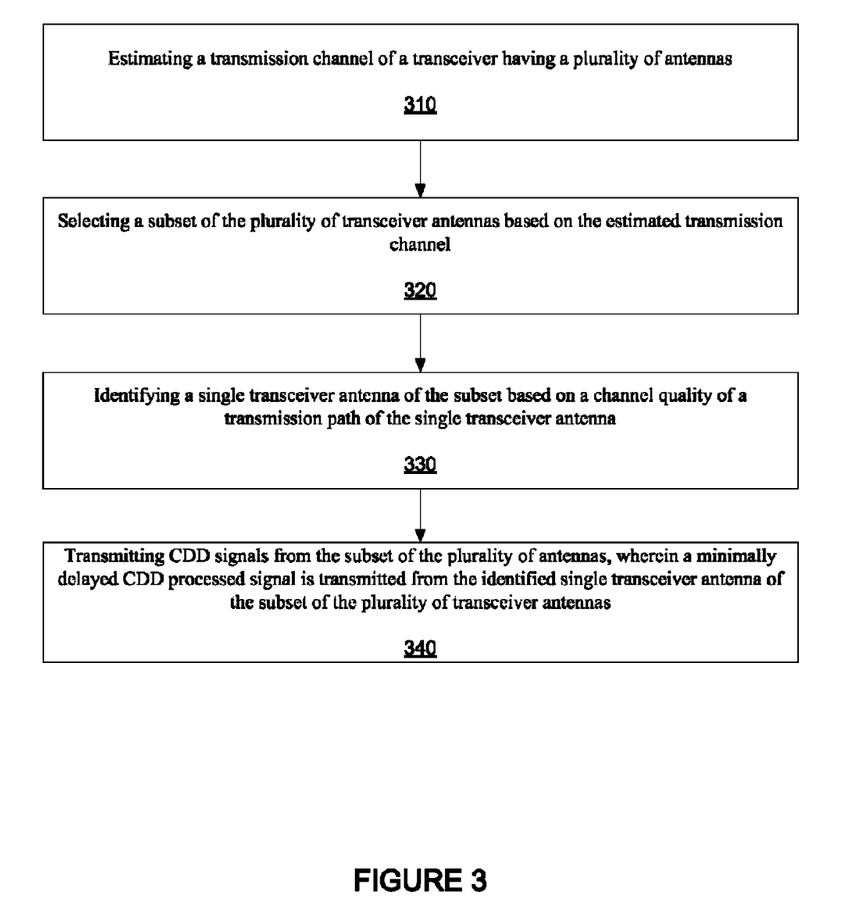
FIG. 3 is a flow chart that includes steps of an example of a method of allocating antennas for cyclic delay diversity transmission.

FIG. 3 is a flow chart that includes steps of an example of a method of allocating antennas for cyclic delay diversity transmission. A first step 310 includes estimating a transmission channel of a transceiver having a plurality of antennas. A second step 320 includes selecting a subset of the plurality of transceiver antennas based on the estimated transmission channel. A third step 330 includes identifying a single transceiver antenna of the subset based on a channel quality of a transmission path of the single transceiver antenna. A fourth step 340 includes transmitting CDD signals from the subset of the plurality of antennas, wherein a minimally delayed CDD processed signal is transmitted from the identified single transceiver antenna of the subset of the plurality of transceiver antennas. For an embodiment, the identified single transceiver antenna is the transceiver antenna that has the best, or at least a near-best link quality as can be determined from the estimated transmission channel.

The channel quality of the transmission paths can be characterized in one of several methods. One method includes determining an insertion loss associated with each antenna.

For an embodiment, not only is the minimal delay allocated to the selected antenna, a majority of transmission signal power is allocated to the identified single transceiver antenna of the subset of the plurality of transceiver antennas. For an embodiment, the allocation of transmission signal power includes allocating power to the identified signal transceiver antenna based upon a power rating of a power amplifier of the identified signal transceiver antenna, and allocating power to a second identified transceiver antenna.

Embodiments include the transceiver determining a target transmission power. For one embodiment, the transceiver determines the target transmission power of the transceiver by receiving a target received power level from a partner transceiver. The transceiver then calculates the target transmission power from the target received power level and an estimated transmission channel path loss. The estimated transmission channel path loss can be calculated from the insertion loss associated with each of the subset of the plurality of antennas. For another embodiment, the transceiver receives the target transmission power of the transceiver from a partner transceiver.

Once the target transmission power level has been determined, the transceiver allocates the target transmission power level amongst the plurality of its antennas. The transceiver starts the allocation process with the antenna having the best link quality (or at least one of the best link qualities). For an embodiment, this includes allocating a first transmit power level to the single transceiver antenna based on a power rating of a power amplifier of the single transceiver antenna. That is, the target transmission power level is initially allocated to just the single transceiver antenna. However, if the power rating of the power amplifier associated with the single transceiver antenna is exceeded by the target power level, then the first transmit power level is set to the rated power level of the power amplifier. The transmission power of the transceiver is the distributed amongst the rest of the antennas.

If the power rating of the power amplifier associated with the single transceiver antenna is exceeded by the target power level, then a second transmit power level of a second transceiver antenna is allocated based on the target transmission power of the transceiver and a power rating of a power amplifier of the second transceiver antenna. That is, the target transmission power level is initially allocated to the single transceiver antenna, and then to the second transceiver antenna. However, if the power rating of the power amplifier associated with the single transceiver antenna and the power rating of the power amplifier associated with the second transceiver antenna are both exceeded by the target power level, then the first transmit power level is set to the rated power level of the power amplifier, and the second transmit power level is also set to the rated power level of the power amplifier (of the second antenna). The transmission power of the transceiver is then distributed amongst the rest of the antennas.

The process of allocating the target power level is continued across the plurality of antennas. That is, if the target power level exceeds the power rating of the amplifiers of the single transceiver antenna and the second transceiver antenna, then a third transmit power level of a third transceiver is allocated based on the target transmission power of the transceiver and a power rating of a power amplifier of the third transceiver antenna.

More generally, an embodiment includes allocating a transmit power level from each of the subset of the plurality antennas according to the target transmission power level, and power ratings of power amplifier of each of the subset of the plurality of antennas. The target transmission power level and power ratings of power amplifiers of each of the plurality of antennas determines the number of transmit antennas included within the subset.

Generally stated, for an embodiment, a delay associated with each of the subset of the plurality of antennas is ordered so that the delay increases for each of the subset of the plurality of antennas with a decrease in path quality associated with each of the plurality of antennas. It is to be understood that the order does not have to be exact.

Figure 4:
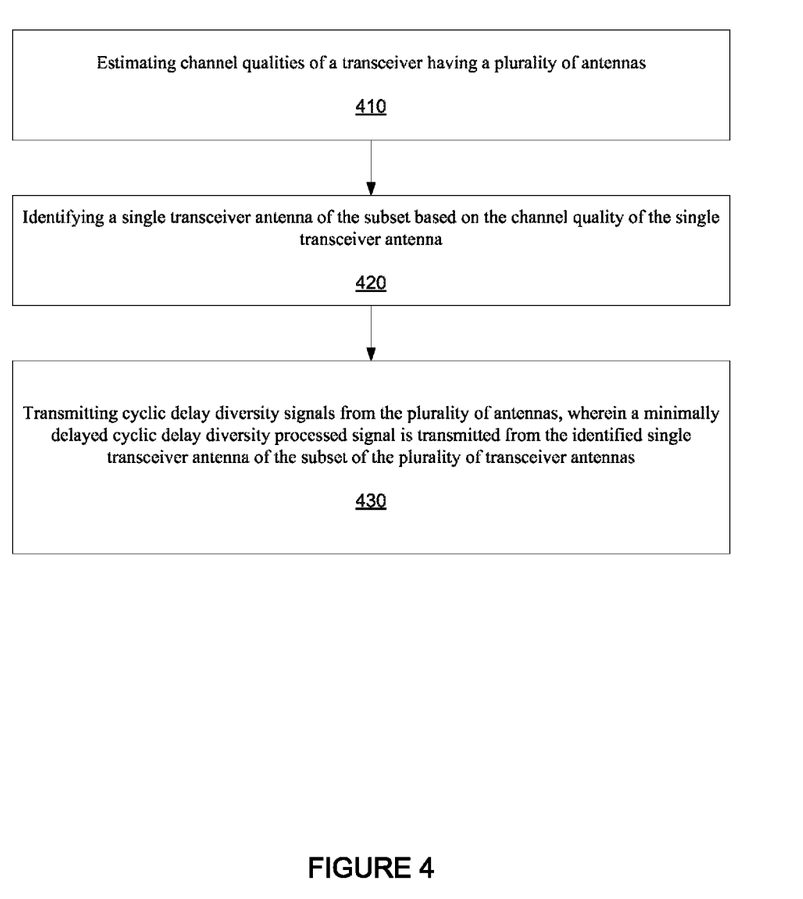
FIG. 4 is a flow chart that includes steps of another example of a method of allocating antennas for cyclic delay diversity transmission.

FIG. 4 is a flow chart that includes steps of another example of a method of allocating antennas for cyclic delay diversity transmission. A first step 410 includes estimating channel qualities of a transceiver having a plurality of antennas. A second step 420 includes identifying a single transceiver antenna of the subset based on the channel quality of the single transceiver antenna. A third step 430 includes transmitting cyclic delay diversity signals from the plurality of antennas, wherein a minimally delayed cyclic delay diversity processed signal is transmitted from the identified single transceiver antenna of the subset of the plurality of transceiver antennas.

As previously described, wherein the transceiver determines a target transmission power. Once the target transmission power has been determined, the target transmission power is realized by distributing the transmission power across the plurality of transceiver antennas.

As previously described, a delay associated with each of the subset of the plurality of antennas can be ordered so that the delay increase for each of the subset of the plurality of antenna's with a decrease in path quality associated with each of the plurality of antennas.

Figure 5:
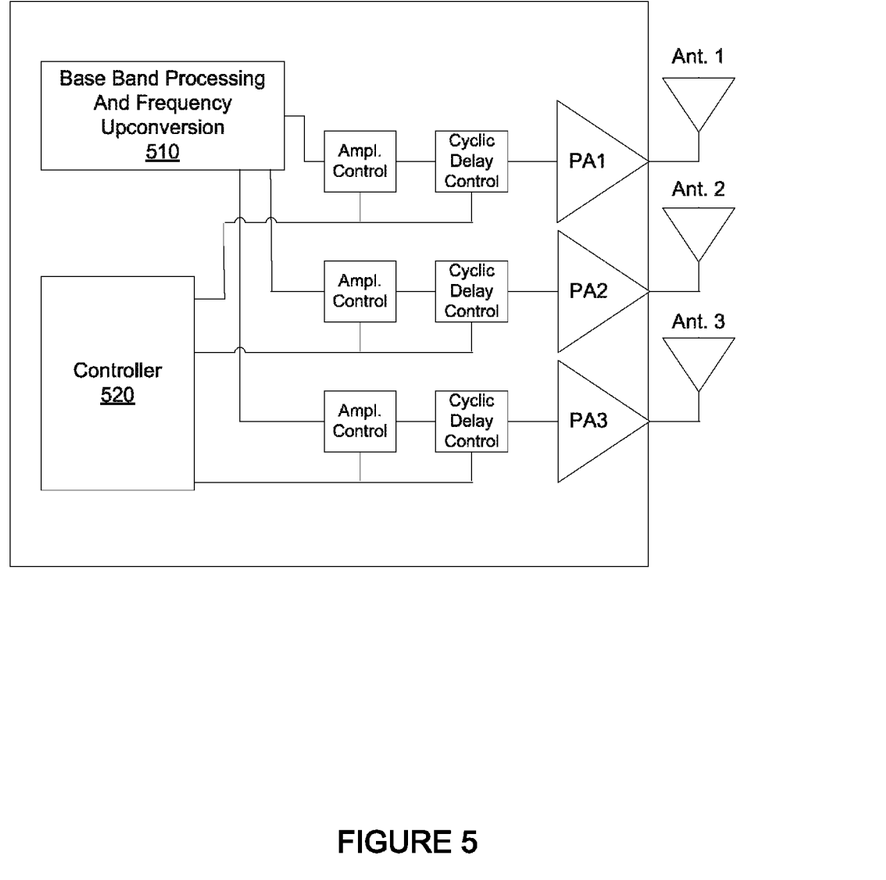
FIG. 5 is a block diagram of an example of a subscriber station that can utilize the described embodiments for allocating delay diversity transmission amongst its antennas.

FIG. 5 is a block diagram of an example of a subscriber station that can utilize the described embodiments for allocating delay diversity transmission amongst its antennas. The exemplary subscriber station includes a controller 520 and standard transceiver base band processing and frequency up-conversion circuitry 510. Based upon principles of the described embodiments, the controller 520 provides delay control of transmission signals of the subscriber station. Additionally, the controller 520 can provide amplitude control of transmission signals. The order and magnitude of the delay associated with each of the antennas (Ant. 1, Ant. 2, Ant. 3) can be according to previously described embodiments. The amplitude control (for setting the transmission power level) for each of the antennas can be according to the previously described embodiments. Typically, the amplitude control is dependent upon the target transmission power level and the power ratings of the power amplifiers (PA1, PA2, PA3) of each of the antennas.

Although specific embodiments have been described and illustrated, the embodiments are not to be limited to the specific forms or arrangements of parts so described and illustrated. The embodiments are limited only by the appended claims.

What is claimed:

1. A method of allocating antennas for Cyclic Delay Diversity (CDD) transmission, comprising:
   estimating a transmission channel of a transceiver having a plurality of transceiver antennas;
   selecting a subset of the plurality of transceiver antennas based on the estimated transmission channel;
   identifying a single transceiver antenna in the subset based on a channel quality of a transmission path of the single transceiver antenna;
   transmitting CDD signals from the subset of the plurality of transceiver antennas, wherein a minimally delayed CDD processed signal is transmitted from the identified single transceiver antenna.

2. The method of claim 1, further comprising allocating a majority of transmission signal power to the identified single transceiver antenna.

3. The method of claim 2, wherein allocating the majority of the transmission signal power comprises allocating power to the identified single transceiver antenna based upon a power rating of a power amplifier of the identified single transceiver antenna, and allocating power to a second identified transceiver antenna.

4. The method of claim 1, further comprising determining a target transmission power of the transceiver.

5. The method of claim 4, wherein determining the target transmission power of the transceiver further comprises receiving a target received power level from a partner transceiver, and calculating the target transmission power from the target received power level and an estimated transmission channel path loss.

6. The method of claim 5, wherein the estimated transmission channel path loss comprises an insertion loss associated with each of the subset of the plurality of transceiver antennas.

7. The method of claim 4, further comprising receiving the target transmission power of the transceiver from a partner transceiver.

8. The method of claim 4, further comprising:
   allocating a first transmit power level of the single transceiver antenna based on a power rating of a power amplifier of the single transceiver antenna;
   allocating a second transmit power level of a second transceiver antenna based on the target transmission power of the transceiver and a power rating of a power amplifier of the second transceiver antenna.

9. The method of claim 8, further comprising:
   allocating a third transmit power level of a third transceiver antenna based on the target transmission power of the transceiver and a power rating of a power amplifier of the third transceiver antenna.

10. The method of claim 4, further comprising allocating a transmit power level from each of the subset of the plurality of transceiver antennas according to the target transmission power level and a power rating of a power amplifier of each of the subset of the plurality of transceiver antennas.

11. The method of claim 4, wherein the target transmission power level and a power rating of a power amplifier of each of the plurality of antennas determine a number of transmit antennas included within the subset.

12. The method of claim 1, wherein a delay associated with each of the subset of the plurality of transceiver antennas is ordered so that the delay increases for each of the subset of the plurality of transceiver antennas with a decrease in path quality associated with each of the plurality of transceiver antennas.

13. A method of allocating antennas for Cyclic Delay Diversity (CDD) transmission, comprising:
   estimating channel qualities of a transceiver having a plurality of transceiver antennas;
   identifying a single transceiver antenna of the plurality of transceiver antennas based on a channel quality of the single transceiver antenna;

transmitting CDD signals from the plurality of transceiver antennas, wherein a minimally delayed CDD signal is transmitted from the identified single transceiver antenna.

14. The method of claim 13, further comprising determining a target transmission power of the transceiver.

15. The method of claim 14, wherein determining the target transmission power of the transceiver comprises receiving a target received power level from a partner transceiver, and calculating the target transmission power from the target received power level and an estimated transmission channel path loss.

16. The method of claim 15, wherein the estimated transmission channel path loss comprises an insertion loss associated with each of the plurality of transceiver antennas.

17. The method of claim 14, further comprising receiving the target transmission power of the transceiver from a partner transceiver.

18. The method of claim 14, further comprising:
allocating a first transmit power level of the single transceiver antenna based on a power rating of a power amplifier of the single transceiver antenna;
allocating a second transmit power level of a second transceiver antenna based on the target transmission power of the transceiver and a power rating of a power amplifier of the second transceiver antenna.

19. The method of claim 18, further comprising:
allocating a third transmit power level of a third transceiver antenna based on the target transmission power of the transceiver and a power rating of a power amplifier of the third transceiver antenna.

20. The method of claim 14, further comprising allocating a transmit power level from each of the plurality of transceiver antennas according to the target transmission power level and a power rating of a power amplifier of each of the plurality of transceiver antennas.

21. The method of claim 14, wherein the target transmission power level and a power rating of a power amplifier of each of the plurality of transceiver antennas determine a number of transmit antennas that are in use.

22. A mobile device, comprising:
a plurality of antennas; and
a controller configured to identify a single antenna of the plurality of antennas based on a channel quality of the single antenna;
wherein the mobile device is configured to transmit Cyclic Delay Diversity (CDD) signals from the plurality of antennas, and wherein a minimally delayed CDD processed signal is transmitted from the identified single antenna.

23. The mobile device of claim 22, wherein the mobile device is further configured to determine a target transmission power.

24. The mobile device of claim 23, wherein the controller is further configured to allocate a first transmit power level of the identified single antenna based on a power rating of a power amplifier of the identified single antenna and allocate a second transmit power level of a second antenna based on the target transmission power of the mobile device and a power rating of a power amplifier of the second antenna.

25. The mobile device of claim 24 wherein the controller is further configured to allocate a third transmit power level of a third antenna based on the target transmission power of the mobile device and a power rating of a power amplifier of the third antenna.

26. The mobile device of claim 23, wherein the controller is further configured to allocate a transmit power level from each of the plurality of antennas according to the target transmission power level and a power rating of a power amplifier of each of the plurality of antennas.

27. The mobile device of claim 23, wherein the target transmission power level and a power rating of a power amplifier of each of the plurality of antennas determine a number of transmit antennas that are in use.

* * * * *